Oct. 5, 1937.　　　　　A. T. KEENE　　　　　2,094,603
APPARATUS FOR CONVERTING WIND PRESSURE INTO MECHANICAL ENERGY
Filed Feb. 4, 1935　　　　6 Sheets-Sheet 3
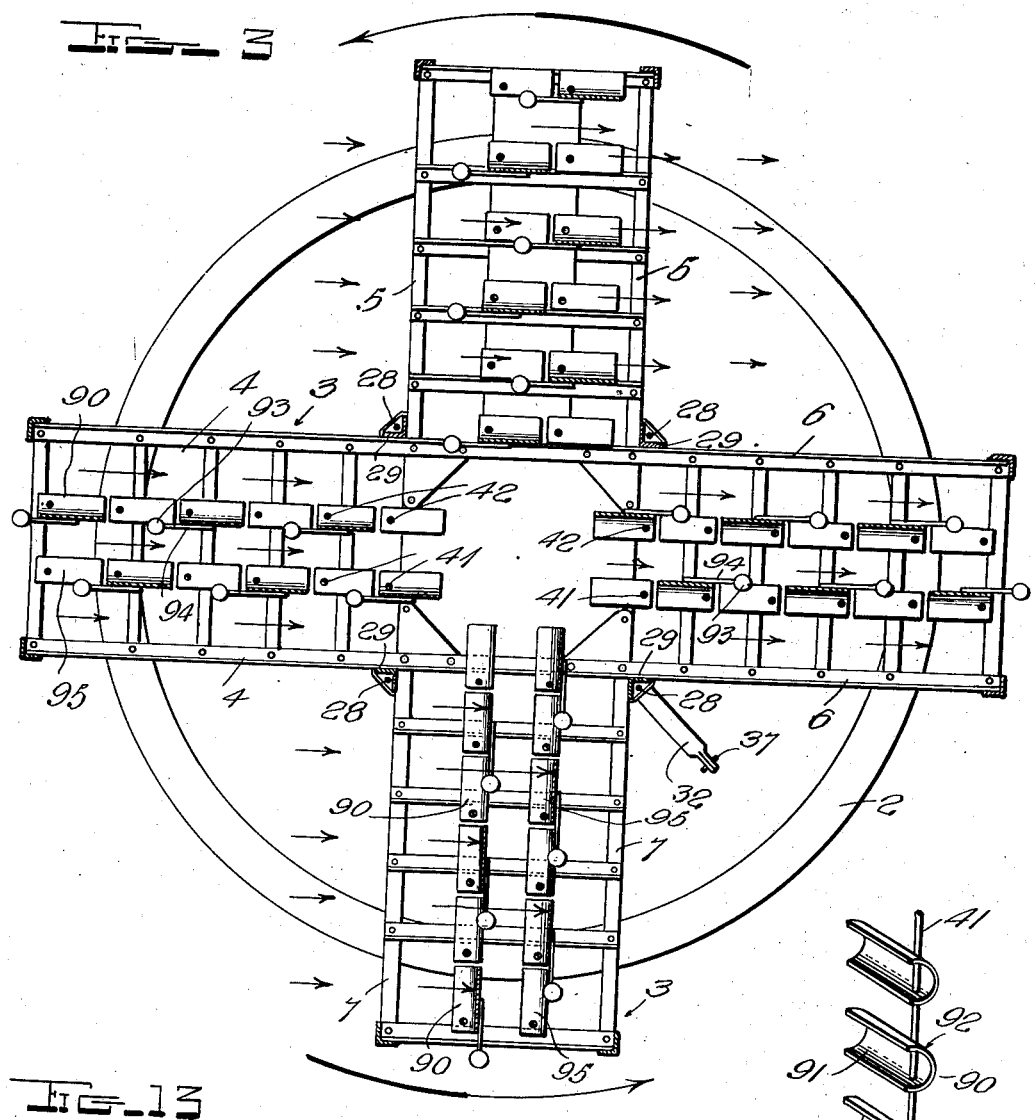
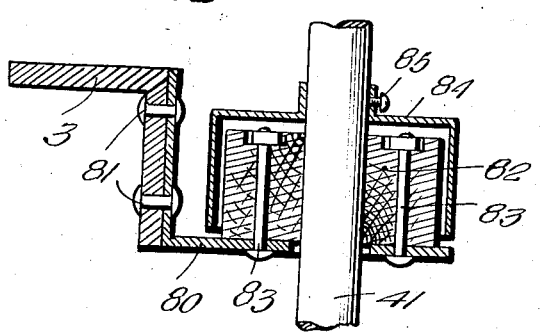
INVENTOR.
A. T. KEENE,
BY John B. Brady
ATTORNEY.

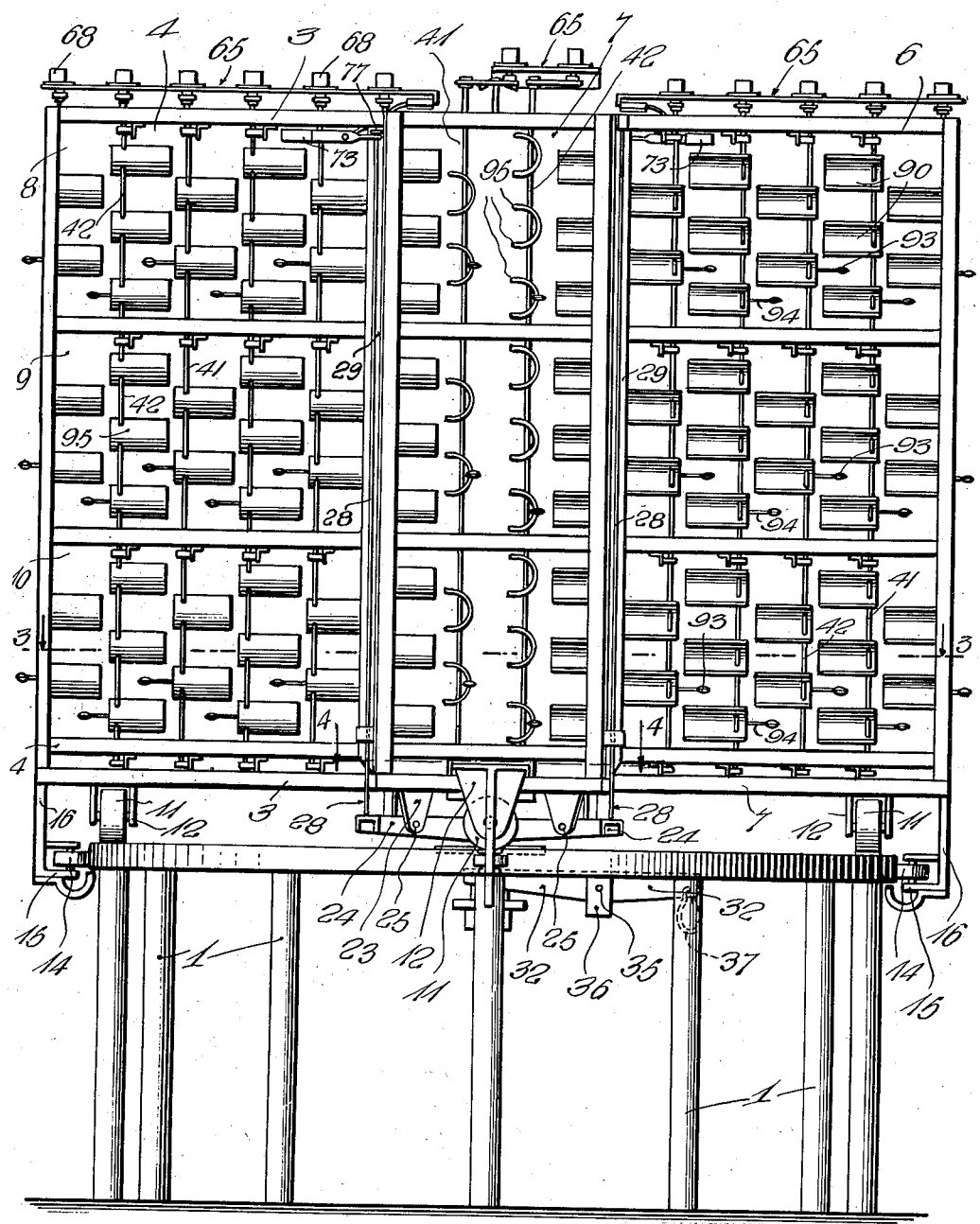

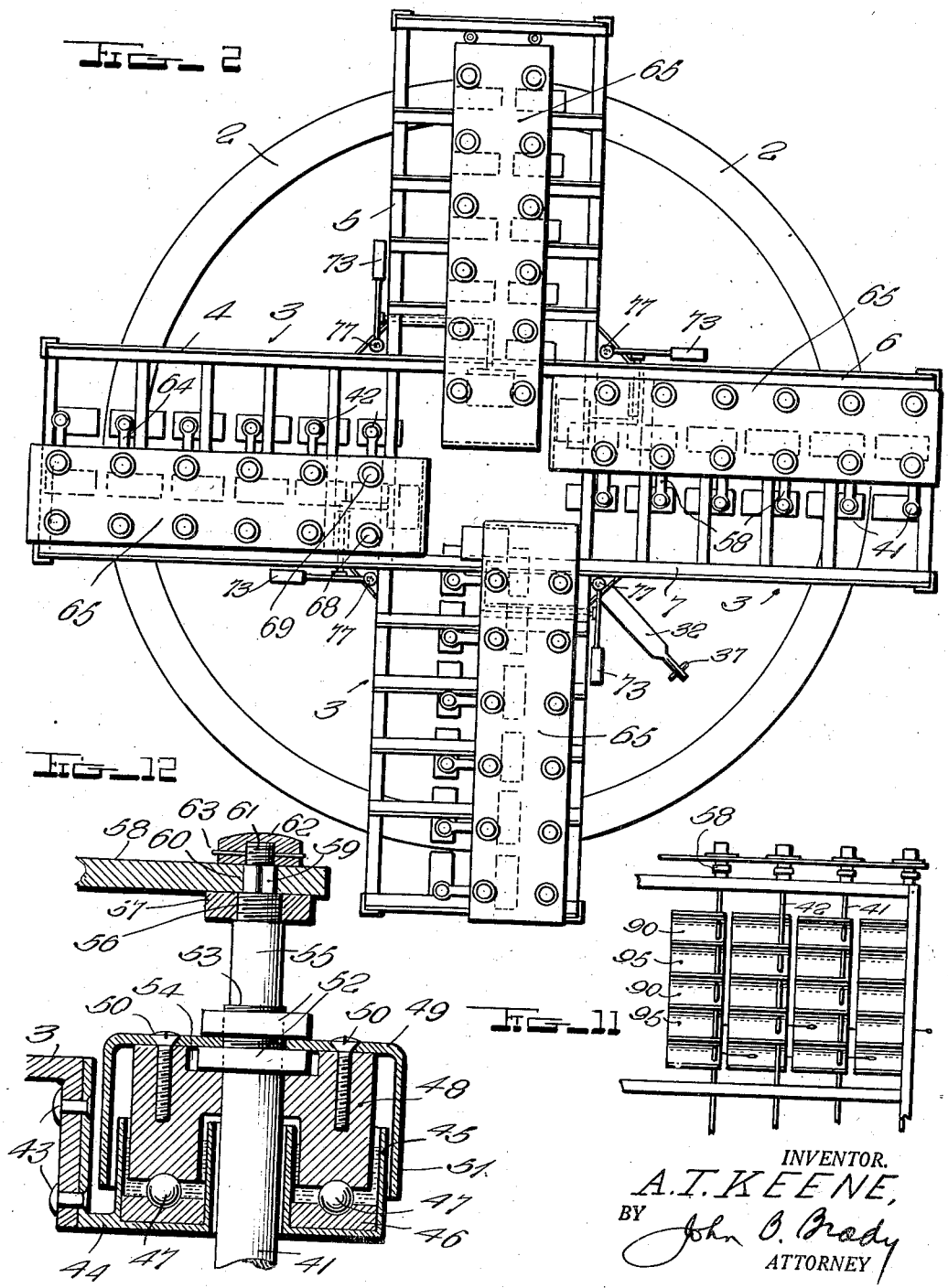

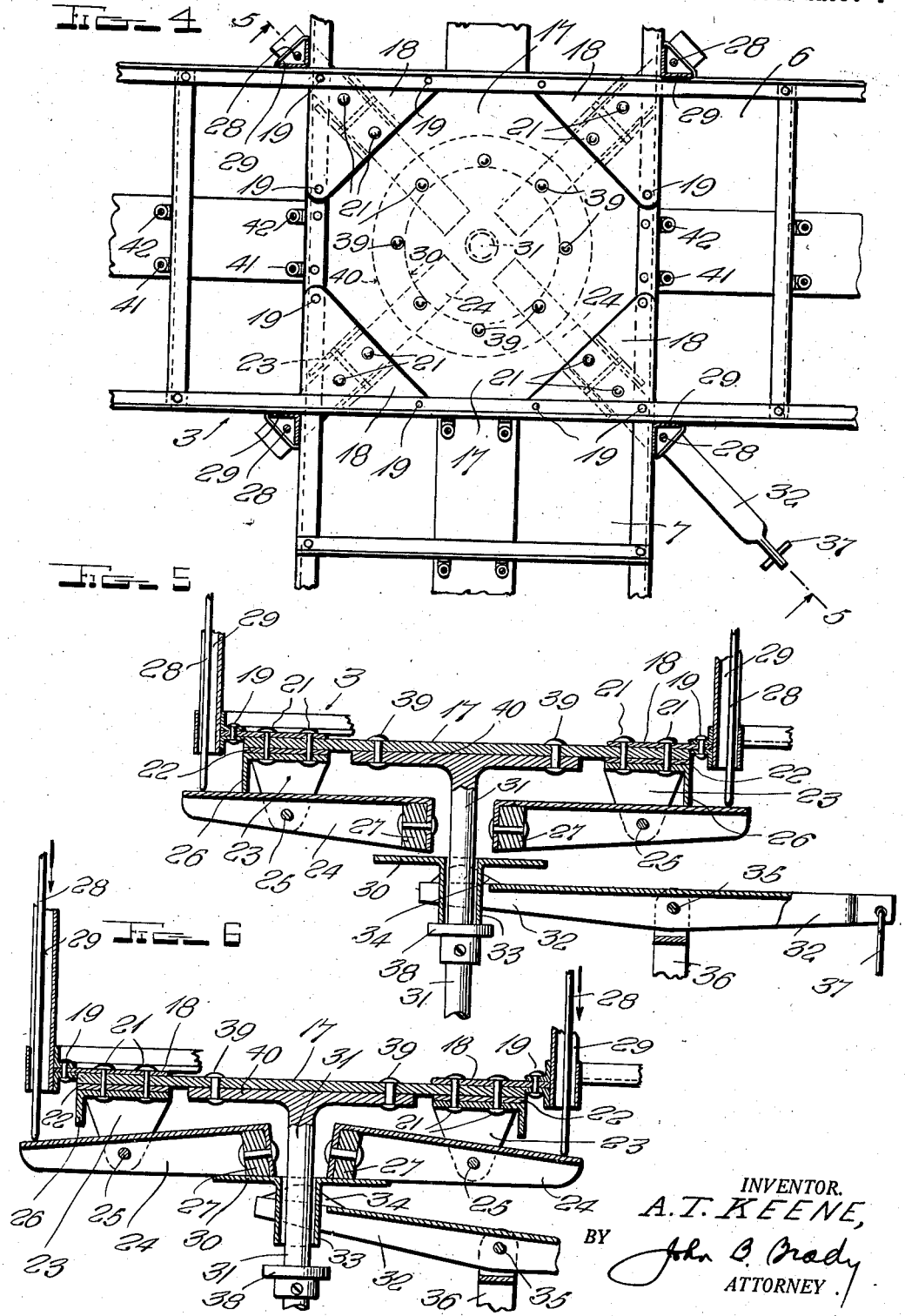

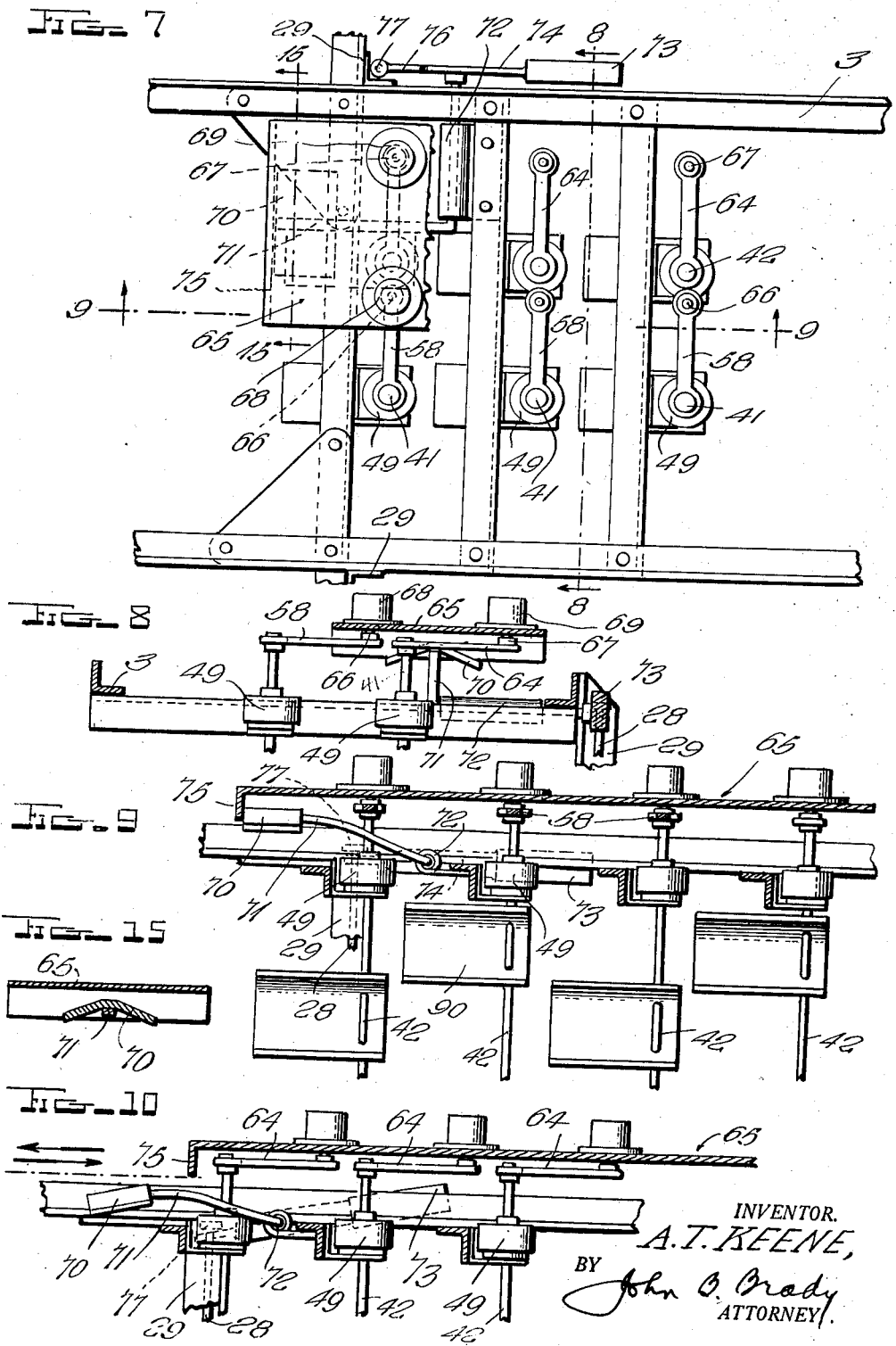

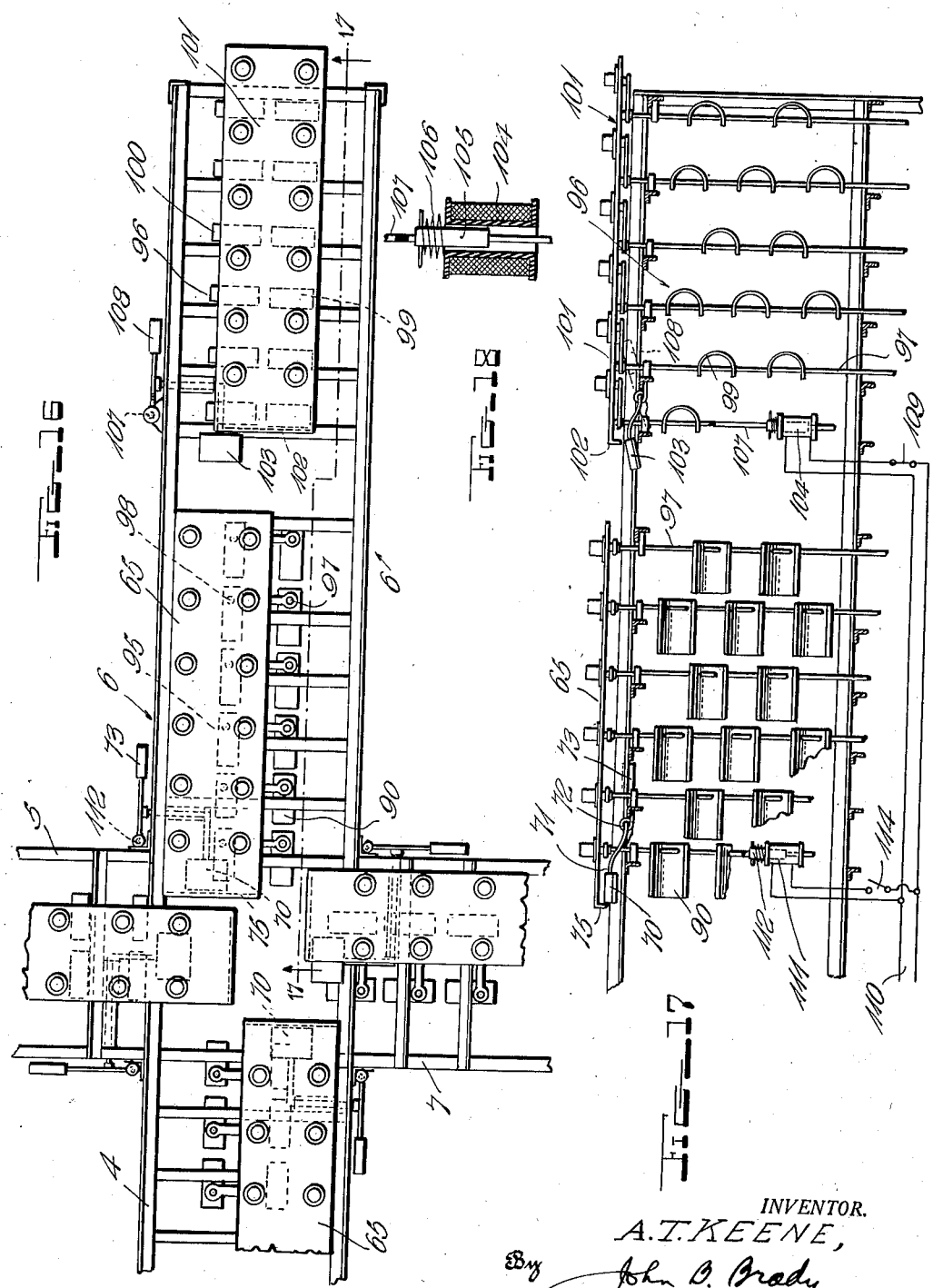

Patented Oct. 5, 1937

2,094,603

UNITED STATES PATENT OFFICE 2,094,603

APPARATUS FOR CONVERTING WIND PRESSURE INTO MECHANICAL ENERGY

Archibald T. Keene, Fairhope, Ala.

Application February 4, 1935, Serial No. 4,927

8 Claims. (Cl. 170—26)

My invention relates broadly to an apparatus for converting wind pressure into mechanical energy, and more particularly to an apparatus for efficiently utilizing natural pressure derived from wind for usefully generating energy on a large scale.

One of the objects of my invention is to provide an apparatus for generating and utilizing mechanical energy derived from wind pressure, in which the maximum amount of energy derived from wind pressure is directly converted into a driving torque, which may be usefully employed in the generation of mechanical energy.

Another object of my invention is to provide a construction of a balanced driving system, operative in accordance with wind pressure which employs a multiplicity of driving units, which may be simultaneously maintained in positions to establish maximum pressure areas for effecting a driving operation, all of which units may be released to bring the driving mechanism to rest independent of the constancy of the wind pressure.

Still another object of my invention is to provide a construction of apparatus for generating mechanical energy from wind pressure, in which a multiplicity of driving units are arranged in positions to be driven by the force of wind and in which each of the driving units is divided into a multiplicity of portions which coact with each other for deriving from the wind pressure, and partial vacuum created thereby, the maximum turning moment proportional to the wind pressure.

A further object of my invention is to provide an apparatus for deriving mechanical energy from wind pressure in which a multiplicity of rows of vanes are arranged in echelon to form pressure areas simultaneously adjustable in mechanical position, according to the wind direction for deriving maximum mechanical energy from both wind pressure and partial vacuum created thereby.

A still further object of my invention is to provide a generator structure adapted to be driven by the wind, wherein a multiplicity of pressure areas are provided, each comprising a plurality of vanes and having means for maintaining the vanes in positions which afford selective maximum or minimum obstruction to the force of the wind, whereby the generator may be driven or brought to rest independently of the constancy of the wind pressure.

Another object of my invention is to provide a structure for converting wind pressure into mechanical energy in which a structural frame having radially extending portions provides mounting means for groups of pressure areas, with means individual to each of the groups for controlling the effective area of the respective group, each of the pressure areas comprising a plurality of vanes.

Still another object of my invention is to provide a structure operative for generating mechanical energy from the force of the wind, in which groups of vanes are mounted in radially extending portions of a frame structure, and means individual to each of the radially extending portions for controlling the angular position of the vanes of one group independent of the corresponding angular position of the vanes of the corresponding groups, in combination with means operative with respect to the aforesaid means for simultaneously releasing all of the vanes from the aforesaid control, and allowing the vanes to assume positions forming minimum obstruction to the wind for bringing the apparatus to rest.

A further object of my invention is to provide a construction of preformed vane for apparatus, operative for usefully employing the force of wind for generating mechanical energy, in which each vane is substantially curved in cross-section and the several vanes are offset in spaced planes with respect to each other, allowing both the pressure and partial vacuum effects to be derived from the force of the wind.

A still further object of my invention is to provide a construction of apparatus for generating mechanical energy from wind pressure, in which a pressure area is provided constituted by a multiplicity of alternately arranged curved vanes, each of the vanes being pivotally mounted adjacent one end thereof, and mechanically balanced for allowing simultaneous movement of each of the said vanes in accordance with the direction of the wind for effectively abstracting the maximum amount of mechanical energy from the force of the wind.

Still another object of my invention is to provide a construction of structural frame mounting for an apparatus for converting wind pressure into mechanical energy, which is capable of extension or expansion from time to time, as added power requirements must be met by the simple addition of further units which are readily connectible with the frame structure of the apparatus of my invention.

Other and further objects of my invention will be more fully understood from the specification hereinafter following, by reference to the accompanying drawings, in which:

Figure 1 is a side elevational view of the apparatus of my invention; Fig. 2 is a plan view of the apparatus shown in Fig. 1; Fig. 3 is a cross-sectional view taken through the apparatus on line 3—3 of Fig. 1; Fig. 4 is a detailed plan view taken along the section 4—4 of Fig. 1; Fig. 5 is a cross-sectional view taken on line 5—5 of Fig. 4; Fig. 6 is a cross-sectional view similar to Fig. 5 but showing the actuated position of the control members for releasing the abutments which control the crank connecting members; Fig. 7 is a plan view partially broken away and showing on an enlarged scale the arrangement of cranks and crank connecting members employed in the apparatus of my invention; Fig. 8 is a cross-sectional view taken on line 8—8 of Fig. 7; Fig. 9 is a sectional view taken on line 9—9 of Fig. 7; Fig. 10 is a sectional view similar to the view shown in Fig. 9 but illustrating the released position of the abutment for allowing free circular movement of the crank connecting member; Fig. 11 is a fragmentary elevational view looking at a portion of one of the pressure areas on one of the radially extending portions of the frame structure; Fig. 12 is a cross-sectional view taken through one form of bearing or journal which I may provide for the upper end of the vertically arranged shaft members and the connecting means for the crank connecting member; Fig. 13 is a cross-sectional view taken through one of the intermediate bearings for the vertically disposed shaft members; Fig. 14 is a perspective view of a portion of one of the shaft members showing the arrangement of the vanes thereon; Fig. 15 is a lateral sectional view through one of the crank connecting members and the coacting abutment which operates in conjunction therewith; Fig. 16 is a plan view of a modified form of my invention in which the effective areas of the radially extending portions of the frame structure may be selectively controlled at will; Fig. 17 is an elevational view of the modified form of apparatus illustrated in Fig. 16; and Fig. 18 is a cross-sectional view taken through one of the control solenoids employed in the apparatus of my invention.

My invention is directed to an apparatus for converting the forces of the wind into mechanical energy. In many parts of the world, there are areas in which wind prevails over relatively long periods of time at appreciable velocity. Data available from the United States Weather Bureau shows that in many sections of the globe, it is not unusual for wind velocities to exist with fair constancy. Such wind velocities may average from five to thirty miles per hour, and higher. Such wind velocities may be measured as pressures in pounds per square foot, and in the examples cited may extend from 0.12 to 4.50 pounds per square foot at the aforementioned wind velocities in miles per hour. After extended search and development, I have devised the apparatus of my invention for usefully employing the pressure of the wind for the generation of mechanical energy. Such wind generator may be utilized for the production of mechanical or electrical energy at low cost.

In the apparatus of my invention, radially extending portions are so constructed that additional sections may be readily added in both a vertical and a radial direction for increasing the capacity of the wind generator. Moreover, the apparatus of my invention may be readily constructed with the radially extending portions at 90°, 60°, or at other angular displacement with respect to each other. The radially extending portions each provide mounting means for pressure areas which constitute the driving means for the generator. The pressure areas in each of the radially extending portions of the frame structure are constituted by a multiplicity of vanes arranged in alternate positions in different planes offset with respect to each other.

The vanes are each preformed to provide a curve shape which will form a maximum obstruction to the wind for deriving from the wind the maximum energy for the development of maximum turning torque. The vanes which are disposed in alternate positions in one plane with respect to the vanes in the adjacent plane make use of both the pressure and vacuum effects of the wind for the development of the turning torque which is applied to the frame structure. That is to say, the vacuum effect which is established on the convex side of the vanes is employed to increase the velocity of air against the concave surfaces of the vanes in the adjacent row of the same group. I so arrange the vanes in one row of the group with respect to the vanes of the same group that a mutual coaction is obtained for insuring maximum utilization of the wind pressure and partial vacuum forces which are established.

Care is taken to counterbalance the vertical shaft members in predetermined positions along the length thereof so that the vanes may be moved under action of the wind with minimum frictional resistance due to the centrifugal action developed by the vanes under the centrifugal force which becomes effective as the frame structure revolves.

The vanes of each group are operative in unison independently of any other group of vanes, and are automatically and simultaneously shiftable to present a maximum driving surface area to the wind on the driving side of the installation while minimum surface area is presented to the wind on the return side of the installation for any given direction of the wind.

Referring to the drawings in more detail, reference character 1 designates the foundation structure on which the apparatus of my invention is mounted. Reference character 2 designates the annular rail system on which the apparatus is supported. The frame for mounting the apparatus is designated generally by reference character 3 and is constituted by radially extending portions which I have designated at 4, 5, 6 and 7. The radially extending portions may have any number of sections mounted one above the other. For purposes of explaining my invention, I have indicated three separate sections in superimposed relation at 8, 9 and 10. Each of the superimposed sections are substantially braced by suitable structural elements to insure a rigid frame structure which in itself offers minimum resistance to the wind and which is wholly self-supporting. The frame structure 3 is mounted upon roller members 11 which engage the annular rail system 2 and allow the frame structure 3 to revolve about the annular rail system. Roller members 11 may be secured to the frame structure 3 on suitable roller bearings carried by mounting means 12. In order to insure the guiding of the frame structure 3 about the annular rail system 2, I provide auxiliary roller members 14 rotatably mounted on mounting means 15 supported from frame 3 by means 16. The auxiliary roller members 14 engage the sides of the annular rail system 2 preventing dislodgment of the apparatus from position on the annular rail system 2. The entire frame structure 3 is free to revolve under pressure of the wind as will be hereinafter more fully explained. The torque for rotative force delivered by the revolving frame structure is transferred from the revolving frame structure through a suitable form of driving shaft reinforced in its connection with the revolving frame structure in various ways.

Figures 4, 5 and 6 illustrate one method by which the power is taken off from the rotating frame structure 3 for any desired purpose. I have shown a plate member 17 connected intermediate the radially extending portions of the revolvable frame structure 3 by means of corner plate members 18 riveted to the frame structure 3 through suitable means such as rivets 19, a rigid interconnection being made between plate 17 and the corner members 18 by means of rivets 21, which rivets also extend through spacer plate members 22 and through bracket members 23. The bracket members 23 depend beneath the revolving structure 3 and serve as pivot means for the angularly shiftable pivotally mounted arms 24 pivoted at 25 in the bracket members 23. The arms 24 are capable of angular movement through a relatively short distance by abutment with the depending portion 26 of the bracket members 23. Each of the arms 24 are weighted at their inner ends, as indicated at 27, and normally tend to shift by gravitation to a position in which the radially extending outwardly projected portions of the arms 24 abut against the limiting stops 26 forming part of the brackets 23. In effecting such gravitational shift, the outer ends of arms 24 engage the lower ends of the abutment control rod members 28. The abutment control rod members 28 extend vertically with respect to the frame structure 3 and are each substantially housed and protected by means of the angular members 29 carried by the frame structure 3. Rod members 28 operate the abutment controls for the pressure areas as will be described more fully hereinafter. The weighted ends of the arms 24 rest in engagement with the annular flange of the collar member 30. The collar member 30 is concentrically disposed about main shaft 31 and is shiftable along main shaft 31 by means of the forked arm 32. The end of the forked arm 32 embraces the sleeve 33 of the collar member 30. Arm 32 is provided with a cam shaped surface 34 directly engaging the lower face of the flanged sleeve 30 for permitting the sleeve to be shifted longitudinally along shaft 31. By raising the weighted ends of the arms 24 in this manner, the abutment control rods 28 are allowed to gravitationally move downwardly for controlling the limiting abutments for the pressure areas as will be hereinafter described. For the purpose of explaining my invention, I have shown arm 32 pivoted at 35 on mounting means 36 with the opposite end of arm 32 adapted to be controlled by any suitable means through rod member 37. By accurately balancing the mass of all of the parts, I arrange the system whereby a minimum force is required for operating the arm 32 and shifting flanged sleeve 30 for angularly moving weighted arms 24 and allowing the abutment control rods 28 to gravitationally move to any desired position. The movement of arm 32 is very slight and is limited on the one side by the flanged abutment 38 and on the other side by the limitations of movement permitted by arms 24.

As heretofore noted, the main shaft 31 extends concentrically through the flanged sleeve 30. A main shaft 31 is connected to central plate 17 in any suitable manner such as rigid connections 39 extending through the flange 40 carried either as an integral or separable part adjacent the shaft 31. The main shaft 31 delivers power to any desired point through suitable transmission for driving any form of equipment including electrical generators, fluid pumps, or for direct power delivery purposes.

The several radially extending sections 4, 5, 6 and 7 include mounting means for the sets of vertically disposed shaft members 41 rotatably mounted in one row in each radially extending frame portion and a set of shaft members 42 rotatably mounted in another row, the first row of shaft members 41 being offset and disposed in spaced relation to the second row of shaft members 42. The vertically arranged shaft members 41 and 42 are rotatably journaled in the radially extending portions of the frame 3 in any desired manner. I have illustrated one form of bearing support for the shaft members which has been shown in an enlarged cross-sectional view in Fig. 12. Shaft member 41 is illustrated terminating adjacent the upper end of the top of frame structure 3 to which is riveted by means of rivet member 43 the journal box 44 provided with an upstanding cylindrical portion 45. The cylindrical portion 45 provides an annular race through which shaft 41 extends. A raceway 46 is mounted in the annular portion of the cylindrical member 45 for guiding ball bearings 47 which coact with an upper race 48 which projects downwardly into the annular raceway formed in cylindrical member 45. The cylindrical member 45 may contain a quantity of oil in which the ball bearings constantly operate. A housing for the bearing is shown at 49 secured by means of screws 50 to the upper race 48. The annular skirt 51 of the housing 49 coacts with the upwardly extending cylindrical portion 45 to maintain the bearing free of dirt, dust, foreign matter, and the elements. The shaft 41 is connected with the upper race 48 by means of nuts 52 which are carried on the screw-threaded end 53 of shaft 41 and which grip opposite sides of the housing 49. The lower nut 52 rests directly in a recess 54 in the upper race 48 and supports the weight of the shaft 41. The upwardly projecting end 55 of shaft 41 is screw-threaded at 56 to receive nut 57 against which the crank 58 is supported. The shaft 41 is polygonally shaped at 59 to coact with a correspondingly shaped aperture 60 in crank 58. In lieu of the polygonally shaped construction of the shaft, I may provide a key and keyway connection between the shaft and the crank. The upper extremity of shaft 41 is screw-threaded, as indicated at 61 to receive the cap nut 62 which is maintained in position by means of pin 63. While I have illustrated one form of construction, it should be clearly understood that the construction shown is wholly illustrative and that I may employ any preferred modified form of detailed construction. I provide means for journaling the shaft members 41 and 42 at intervals along the vertical height of the radially extending frame portions. Fig. 13 shows one form of bearing which I may employ for the intermediate journaling of the shaft members 41 and 42. Bracket member 80 is riveted or suitably secured by means 81 through the frame structure 3. Bracket 80 is apertured for the passage of shaft 41. Shaft 41 extends through the wood sleeve 82 suitably secured by bolt connections 83 to bracket 80. The wood sleeve 82 is housed by means of casing member 84 secured by suitable means such as 85 to shaft 41. The wood sleeve 82 may be impregnated with a lubricant to insure the continuous free running of the shaft members 41 and 42 at the same time that the shaft members are adequately supported intermediate the different sections of the radially extending portions of the frame structure.

It will be understood that the shaft members 41 and 42 in the displaced rows of shaft members are arranged in each of the radially extending portions 4, 5, 6, and 7 of the frame structure 3. For the sake of clarity, I have shown on an enlarged scale, in Fig. 7, a fragmentary view of the cranks connected with the shaft members 41 and 42. The cranks connected with shaft members 41 are shown at 58. The cranks connected with shaft members 42 are shown at 64. In order to provide for the control of shaft members 41 and 42 in unison, I provide a crank connecting member 65. For purposes of explaining my invention, I have shown the crank connecting member in the form of a laterally extending plate 65, but it will be understood that the crank connecting member may assume other forms such as a chain and sprocket arrangement or structural interconnecting member of a variety of forms or shapes. The cranks 58 and 64 each have upwardly projecting pins 66 and 67 thereon. These pins 66 and 67 fit into sockets provided in cap members 68 and 69 carried on the crank connecting member 65. The pins have a certain amount of lost motion with respect to the sockets in which they operate to allow for inequalities which may occur in the design and assembly of the several coacting cranks.

While showing pin and pocket connections for the control of the cranks 58 and 64, it should be understood that other forms of connections may be made. The crank connecting member 65 is capable of movement in an orbit substantially longitudinally of the radially extending portions of the frame structure. Each crank connecting member 65 may move in an oscillatory path or in a circular path, depending upon the control of the crank connecting member by means of certain abutments which I provide. A separate abutment is provided for each crank connecting member, and the various abutments are independently controlled. The abutments are shown more clearly in Figs. 7, 8, 9, and 10, and each include a plate member or shoe 70 carried on lever arm 71, which is pivoted in journal 72 carried by frame structure 3. The lever 71, counterbalanced by means of the counterbalance weight 73, is connected in such a manner as to produce a turning torque on lever 71.

Normally the counterbalance weight 73 produces a clockwise torque on lever 74 which shifts lever 71 to a position in which shoe 70 is elevated to engage beneath the depending end 75 of the crank connecting member 65. The counterbalance weight lever 74 is extended to the position 76 and is engaged by the headed end 77 of the abutment control rod 28, explained more fully in connection with Figs. 4, 5, and 6. The abutment control rod 28, when released by movement of arms 24, operates against the mass of counter-weight 73 to enable shoe 70 to gravitate away from crank connecting member 65, and thereby release crank connecting member 65 for free circular movement. The mass of abutment control rod 28 is designed sufficiently in excess of the mass of counter-weight 73 to insure the lowering of shoe 70, when levers 24 are actuated to allow abutment control rods 28 to gravitate. The vertically extending shafts 41 and 42 are thus controlled in each section of the radially extending portions of the frame structure, so that one set of vertically extending shaft members in one section move in unison, but independently of the movement of the vertically extending shaft members in the other sections of the frame structure.

The shaft members 41 and 42 as they extend through the superimposed sections, provide means for mounting the several vanes which constitute the driving pressure areas for the apparatus of my invention. I have designed the vanes with a view of converting maximum energy from available wind pressure. I have shown in Fig. 14 a perspective view of the vanes mounted on the vertically disposed shaft 41. It will be observed that the vanes 90 are shaped to provide a concave pressure surface 91 and convex surface 92. It will also be observed that the vertically extending shaft 41 passes through the vanes adjacent one edge thereof. The tendency resulting from this unbalanced mounting, from the viewpoint of centrifugal force, is to keep the longer portions of the vanes directed outwardly from the central axis. This tendency is undesirable since wind pressure would be required to overcome the centrifugal force which is present when the apparatus is in operation. I, therefore, provide a counterbalance weight 93 carried on an arm 94 for the vanes in each section of the apparatus, so that the turning moment on shaft 41 is produced by pressure of the wind with minimum mechanical losses and without opposition by centrifugal force.

I also wish to point out that the shaft 41 is arranged substantially chordal to the vanes so that the shaft 41 extends through the curve of each of the vanes. The vanes 90, which are carried on the shaft members 41, alternate in position with respect to the vanes 95 which are carried on the shaft 42. Fig. 1 shows the arrangement of the vanes 90 and 95 in echelon or staggered arrangement in the radially extending section 7. For the sake of clarity, I have omitted showing the vanes 95 in the radially extending section 6, and the vanes 90 in the radially extending section 4 in Fig. 1. However, the actual appearance of the pressure areas is as shown in Fig. 11, wherein the vanes 90 and 95 alternate in position and receive the force of the wind directly thereagainst, thereby forming a substantially continuous pressure area. The alternate arrangement of the vanes 90 and 95 insures the maximum conversion of energy from the wind pressure, as the partial vacuum created adjacent one set of vanes in one plane tends to create driving pressure which integrates with the driving pressure derived from the force of the wind for driving the vanes in the adjacent plane. As heretofore explained, the vanes in one radially extending section move in unison independently of the movement of the vanes in the corresponding radially extending sections.

By reason of the fact that the vanes in one radially extending section are free to move independently of the movement of the vanes in a corresponding radially extending portion of the frame structure, the vanes are capable of automatic adjustment in angular position as the frame structure rotates and in accordance with the direction of the wind. This will be understood by detailed reference to Fig. 3 in which it will be seen that wind in the direction of the arrows approaches the vanes in radially extending portion 4 streamline with respect to the vanes 90 and 95. This is also the case with respect to the vanes in section 5 and in section 6. The vanes in section 7, however, are automatically adjusted in planes normal to the direction of the wind and serve through one quadrant of movement of the frame structure 3 to drive the frame structure 3 under pressure of the wind. As the vanes shift to positions which might tend to retard the movement of the frame structure 3, they automatically assume streamline positions so that the frame structure 3 returns toward the wind with minimum obstruction to the wind. That is to say, the vanes in the radially extending portions 4, 5 and 7 successively and repeatedly, through substantial quadrantal portions of the orbit of the frame structure, come into operative positions for adding rotative impulses to the movement of the frame. The coaction of the several radially extending portions and the pressure areas therein accordingly add up the forces to produce a substantial turning torque on the frame structure.

In the successive and repeated operations of the vanes in each of the radially extending portions, the abutments or shoes 70 are maintained in an extreme upward position whereby the crank connecting member 65 cannot move in a complete circular path but is limited to an oscillatory path. Where, however, it is desired to shut down the operation of the frame structure, the control mechanism including lever 32 which has heretofore been explained is operated to move arms 24 in a position whereby abutment control rods 28 gravitate to a position which allows abutments or shoes 70 to be released from engagement with the depending end 75 of the crank connecting member 65 thereby allowing continuous movement of the crank connecting members in a circular path so that the vanes instead of being locked in a predetermined position to present pressure areas in a plane normal to the direction of the wind are free to be continuously shifted to streamline position according to the direction of the wind thereby providing substantially no driving area at all so that the wind is free to blow through the apparatus without driving the apparatus.

There are conditions under which I may desire to modify the speed at which the apparatus of my invention is driven by the wind, in which event, I divide the pressure areas in each pressure section or wing into selective groups of vanes and arrange means for controlling the selective groups to provide either an effective pressure area or an ineffective pressure area, as desired.

Figs. 16, 17, and 18 show different modified forms of my invention. It will be observed that the radially extending sections are provided with selective groups of vanes. For example, radially extending portion 6 of the frame structure is radially extended to provide mounting means for a selective group of vanes shown generally at 96. The vanes in the selective group 96 are carried by sets of vertically extending shaft members 97 and 98. Shaft members 97 and 98 are journaled in the extended portion 96 of the frame structure and provide mounting means for the vanes 99 and 100. The crank connecting member 101 which interconnects the cranks on the shafts 97 and 98 is of generally similar construction to the crank connecting member 65 and associated mechanism heretofore described. The crank connecting member 101 is provided with a depending end 102 which normally provides a stop against the limiting abutment 103 which corresponds generally to the abutment or shoe 70 coacting with the downwardly extending end 75 of crank connecting member 65. However, in order to provide for the simplified selective control of the groups of vanes, I arrange a solenoid operating mechanism shown more clearly in Fig. 18 wherein the electromagnetic winding 104 operates to control the movement of armature member 105 against the action of spring 106 for purposes of shifting abutment control rod 107 for retracting shoe 103 against the operation of the counter-weight 108 when it is desired to remove any obstruction to the free movement of the vanes 99 and 100. That is to say, by closing the control circuit by movement of switch 109, solenoid winding 104 is energized from power supply circuit 110 to retract abutment 103 out of the path of the depending portion 102 of the crank connecting member 101. When the solenoid winding 104 is deenergized, the counter-weight 108 returns the shoe 103 to its extreme upward position and crank connecting member 101, in the course of its movement again engages over shoe 103 and is thereby brought to a limiting stop with the vanes in planes normal to the direction of the wind. Inasmuch as it is desired to selectively control the vanes in groups, I provide, in the arrangement shown in Figs. 16, 17 and 18, a similar electrical control for the main group of vanes 90 and 95. The electrical control for the main group of vanes includes solenoid 111 operating armature 112 for controlling the abutment control rod 28. The electrical control circuit to the solenoid winding 111 is controlled through switch 114 from the power circuit 110.

In describing my invention, I have referred to certain preferred forms of construction, but I have in mind various engineering details for carrying out the operation of various parts of the equipment and it is not the intention of any of the illustrative forms in which my invention has been shown to limit my invention to the illustrated forms. Accordingly, I reserve to myself all forms of my invention and I intend no limitations upon my invention other than are imposed by the scope of the appended claims.

What I claim as new and desire to secure by Letters Patent of the United States is as follows:

1. In an apparatus for converting wind pressure into mechanical energy, a revolvably mounted frame structure, a plurality of radially projecting portions on said frame structure, a group of shaft members revolvably mounted in each of said projecting portions, groups of vanes mounted on said revolvably mounted shaft members, and means interconnecting the shaft members of each group for controlling the movement of said vanes simultaneously but independently of the vanes of the corresponding groups.

2. An apparatus for converting wind pressure into mechanical energy comprising a revolvably mounted frame structure, projecting portions on said frame structure, groups of vertically disposed shaft members rotatably mounted in each of said projecting portions, groups of vanes mounted on said vertically disposed shaft members, and means interconnecting the shaft members of each group for controlling the movement of the shaft members of each group in unison independently of the movement of the shaft members of adjacent groups, said vanes carried by said shaft members in alternate and disaligned positions so that a driving pressure surface is presented in a position substantially normal to the direction of the wind by all of said vanes of any one group operating in unison in accordance with the direction of the wind.

3. Apparatus for converting wind pressure into mechanical energy, comprising a frame structure, vertical shaft members journaled in said frame structure, crank arms connected with said shaft members, a crank connecting member connected in common with said crank arms, an abutment for normally limiting the displacement of said crank connecting member whereby said shaft members are limited to predetermined oscillatory movement, means for releasing said abutment whereby said crank connecting member is free to move in a circular path, and vanes mounted on said shaft members and coacting to provide a driving pressure surface according to the angular position of said vanes with respect to the direction of the wind.

4. Apparatus for converting wind pressure into mechanical energy comprising a frame structure having a multiplicity of radially projecting portions thereon, groups of vertically disposed shaft members journaled in each of said projecting portions, groups of vanes mounted on said vertically disposed shaft members, means interconnecting the shaft members of each group for simultaneously controlling the angular movement of the vanes on the shaft members in each of said groups, the vanes in one group being displaceable independently of the adjustment of the vanes in the corresponding groups.

5. In an apparatus of the class described, a pressure section comprising a frame structure, a multiplicity of vanes, a plurality of shaft members for mounting said vanes in said frame structure, a connecting member interconnecting all of said shaft members and a releasable abutment providing a limiting stop for said connecting member in one position and shiftable out of the path of said connecting member in another position.

6. Apparatus as described in claim 4 and including separate abutment means cooperative with each said shaft interconnecting means for aligning the vanes of the respective groups of shaft members to receive wind pressure, and means connected in common with the abutment means associated with correspondingly positioned groups of shaft members in the radially projecting portions of said frame structure for simultaneously and selectively controlling the operability of the respective groups of vanes.

7. In apparatus for converting wind pressure into mechanical energy, a revolvably mounted frame structure including a plurality of radially extending portions, a plurality of shaft members rotatably mounted in each of said extending portions, a group of vanes mounted on the shaft members of each plurality in spaced relation, means interconnecting the shaft members of each plurality for controlling the movement of the corresponding group of vanes independently of the vanes in other groups, abutment means cooperating with said interconnecting means for normally limiting the angular displacement of said vanes, and means for releasing said abutment means for allowing the vanes to be displaced in angular position beyond the position limited by said abutment means.

8. Apparatus for converting wind pressure into mechanical energy, comprising a wind pressure driving surface constituted by a plurality of curved surface vanes disposed in echelon in parallel planes, the curved surface vanes in one plane being disposed in the positions of greatest density of flowing air passing the curved surface vanes in the other plane, shaft members carrying the said curved surface vanes in echelon, and means interconnecting said shaft members for insuring simultaneous angular displacement of all of said curved surface vanes.

ARCHIBALD T. KEENE.